United States Patent
Lee et al.

(10) Patent No.: US 10,429,560 B2
(45) Date of Patent: Oct. 1, 2019

(54) METHODS FOR MANUFACTURING POLARIZING ELEMENT, POLARIZING ELEMENT ROLL AND SINGLE SHEET TYPE POLARIZING ELEMENT HAVING LOCAL BLEACHING AREAS

(71) Applicant: LG CHEM, LTD., Seoul (KR)

(72) Inventors: Beom Seok Lee, Daejeon (KR); Eung Jin Jang, Daejeon (KR); Kyun Il Rah, Daejeon (KR); Hyung Koo Kang, Daejeon (KR); Byung Sun Lee, Daejeon (KR); Du Jin Choi, Daejeon (KR); Ho Jeong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 115 days.

(21) Appl. No.: 15/100,420

(22) PCT Filed: Mar. 25, 2015

(86) PCT No.: PCT/KR2015/002936
§ 371 (c)(1),
(2) Date: May 31, 2016

(87) PCT Pub. No.: WO2015/147552
PCT Pub. Date: Oct. 1, 2015

(65) Prior Publication Data
US 2016/0299271 A1    Oct. 13, 2016

(30) Foreign Application Priority Data

Mar. 26, 2014  (KR) .................. 10-2014-0035614
Mar. 26, 2014  (KR) .................. 10-2014-0035619
Jun. 30, 2014  (KR) .................. 10-2014-0080491

(51) Int. Cl.
*B29D 11/00*   (2006.01)
*B23K 26/38*   (2014.01)
(Continued)

(52) U.S. Cl.
CPC ........... *G02B 5/3033* (2013.01); *B23K 26/38* (2013.01); *B23K 26/402* (2013.01);
(Continued)

(58) Field of Classification Search
None
See application file for complete search history.

(56) References Cited

U.S. PATENT DOCUMENTS 2,445,581 A *  7/1948  Land ................ G02B 5/3033
                                              359/486.02
4,181,756 A    1/1980  Fergason
(Continued)

FOREIGN PATENT DOCUMENTS

EP    1555549 A2   7/2005
EP    2426522 A1   3/2012
(Continued)

OTHER PUBLICATIONS

KR-20100125537A EPO Machine Translation Performed Dec. 20, 2017. (Year: 2017).*
(Continued)

*Primary Examiner* — Lisa L Herring
(74) *Attorney, Agent, or Firm* — Dentons US LLP

(57) ABSTRACT

The present invention relates to a method for manufacturing a polarizing element including locally bleached areas including steps of providing a polarizing element including a polyvinyl alcohol-based polarizer in which at least one of iodine and dichroic dye is oriented in a certain direction; forming a mask layer including at least one punched area on one surface of the polarizing element; partially bleaching the polarizing element formed with the mask layer by immersing the polarizing element into a bleaching solution; and correcting an appearance of the partially bleached polarizing element.

17 Claims, 7 Drawing Sheets

(51) Int. Cl.
*B23K 26/402* (2014.01)
*B23K 103/00* (2006.01)
*B29K 29/00* (2006.01)
*G02B 5/30* (2006.01)
*G02B 1/10* (2015.01)
*G02B 1/14* (2015.01)

(52) U.S. Cl.
CPC .......... *B29D 11/00644* (2013.01); *G02B 1/10* (2013.01); *G02B 1/14* (2015.01); *B23K 2103/42* (2018.08); *B23K 2103/50* (2018.08); *B29D 11/00865* (2013.01); *B29K 2029/04* (2013.01)

(56) References Cited

U.S. PATENT DOCUMENTS

| | | | |
|---|---|---|---|
| 4,396,646 A | | 8/1983 | Schuler et al. |
| 4,420,552 A | * | 12/1983 | Peck .................. B41M 3/00 430/252 |
| 4,466,704 A | | 8/1984 | Schuler et al. |
| 5,327,285 A | | 7/1994 | Faris |
| 5,537,144 A | | 7/1996 | Faris |
| 2007/0141244 A1 | | 6/2007 | Bell et al. |
| 2008/0192345 A1 | * | 8/2008 | Mochizuki ............ B29C 55/026 359/485.01 |
| 2008/0225210 A1 | | 9/2008 | Shimoda et al. |
| 2009/0086130 A1 | | 4/2009 | Oikawa et al. |
| 2010/0245727 A1 | * | 9/2010 | Shigetomi ............... B29C 55/04 349/96 |
| 2010/0314032 A1 | * | 12/2010 | Kumagai ............ B32B 38/1808 156/192 |
| 2011/0273646 A1 | * | 11/2011 | Fukagawa .................. C08J 5/18 349/96 |
| 2012/0067506 A1 | | 3/2012 | Tan et al. |
| 2012/0106063 A1 | | 5/2012 | Mathew et al. |
| 2013/0044282 A1 | | 2/2013 | Kuwabara et al. |
| 2013/0149546 A1 | | 6/2013 | Mori et al. |
| 2014/0044947 A1 | | 2/2014 | Sawada et al. |
| 2014/0319436 A1 | * | 10/2014 | Harada ................. G02B 5/3083 252/582 |
| 2015/0131035 A1 | | 5/2015 | Chen |
| 2015/0146294 A1 | * | 5/2015 | Watanabe ............ G02B 5/3033 359/487.02 |
| 2015/0160390 A1 | * | 6/2015 | Goyal .................. G02B 5/3033 348/552 |
| 2015/0316696 A1 | | 11/2015 | Kamijo et al. |
| 2016/0025910 A1 | | 1/2016 | Sawada et al. |
| 2016/0202403 A1 | | 7/2016 | Mathew et al. |
| 2016/0299271 A1 | | 10/2016 | Lee et al. |
| 2016/0299272 A1 | | 10/2016 | Lee et al. |
| 2016/0377777 A1 | | 12/2016 | Lee et al. |
| 2017/0045656 A1 | | 2/2017 | Ogomi et al. |

FOREIGN PATENT DOCUMENTS

| | | |
|---|---|---|
| EP | 2447766 A1 | 5/2012 |
| EP | 2735600 A1 | 5/2014 |
| JP | 58-062381 A | 4/1983 |
| JP | 58062381 U1 | 4/1983 |
| JP | 58-065076 A | 5/1983 |
| JP | 58-168020 A | 10/1983 |
| JP | 6036563 B2 | 8/1985 |
| JP | 63-21990 A | 1/1988 |
| JP | 63-265203 A | 11/1988 |
| JP | 095519 A | 1/1997 |
| JP | 2002258051 A | 9/2002 |
| JP | 2002-350638 A | 12/2002 |
| JP | 2005084506 A * | 3/2005 |
| JP | 2005266502 A | 9/2005 |
| JP | 2006-058838 A | 3/2006 |
| JP | 2009-048179 A | 3/2009 |
| JP | 2009-098636 A | 5/2009 |
| JP | 2010-001422 A | 1/2010 |
| JP | 2011145675 A | 7/2011 |
| JP | 2011-257756 A | 12/2011 |
| JP | 2012-126127 A | 7/2012 |
| JP | 2012-137738 A | 7/2012 |
| JP | 2013-063666 A | 4/2013 |
| JP | 2013137551 A | 7/2013 |
| JP | 5255502 B2 | 8/2013 |
| JP | 2014-037523 A | 2/2014 |
| JP | 2015-534100 A | 11/2015 |
| JP | 2015-215608 A | 12/2015 |
| JP | 2016-027135 A | 2/2016 |
| KR | 10-2010-0007272 A | 1/2010 |
| KR | 10-2010-0125537 A | 12/2010 |
| KR | 10-2010-0125558 A | 12/2010 |
| KR | 10-2010-0125560 A | 12/2010 |
| KR | 1020100125558 A | 12/2010 |
| KR | 10-2011-0115728 A | 10/2011 |
| KR | 1020110115728 A | 10/2011 |
| KR | 10-2012-0046035 A | 5/2012 |
| KR | 1020120046035 A | 5/2012 |
| KR | 10-2013-0080869 A | 7/2013 |
| TW | 200700780 A | 1/2007 |
| TW | 201224716 A1 | 6/2012 |
| WO | 2012/058525 A1 | 5/2012 |
| WO | 2014/031726 A1 | 2/2014 |
| WO | 2014123184 A1 | 8/2014 |

OTHER PUBLICATIONS

KR20100007272A EPO Machine Translation Performed Dec. 21, 2017. (Year: 2017).*
JP2005-084506A Google Patents Machine Translation Performed May 10, 2018. (Year: 2018).*
Search Report of European Patent Office in Appl'n No. 15768375.6, dated Oct. 16, 2017.
Search Report of European Patent Office in Appl'n No. 15769219.5, dated Oct. 16, 2017.

* cited by examiner

METHODS FOR MANUFACTURING POLARIZING ELEMENT, POLARIZING ELEMENT ROLL AND SINGLE SHEET TYPE POLARIZING ELEMENT HAVING LOCAL BLEACHING AREAS

TECHNICAL FIELD

This application is a National Stage Entry of International Application No. PCT/KR2015/002936, filed on Mar. 25, 2015, and claims the benefit of and priority to Korean Application No. 10-2014-0035619, filed on Mar. 26, 2014, Korean Patent Application No. 10-2014-0035614, filed on Mar. 26, 2014, and Korean Patent Application No. 10-2014-0080491, filed on Jun. 30, 2014, all of which are incorporated herein by reference in their entirety for all purposes as if fully set forth herein.

The present invention relates to methods for manufacturing a polarizing element, a polarizing element roll and a single sheet-type polarizing element, and in particular, to a method for manufacturing a polarizing element including locally bleached areas for performing functions such as installing components and/or developing colors and the like, and methods for manufacturing a polarizing element roll and a single sheet-type polarizing element.

BACKGROUND

Polarizing plates have been used in various display devices such as liquid crystal display devices and organic light emitting diodes. Most polarizing plates currently used are used in a form of dyeing iodine and/or dichroic dye on a polyvinyl alcohol (hereinafter, PVA)-based film, crosslinking the iodine and/or dichroic dye using boric acid and the like, and orienting the result using a method of elongation to prepare a Polarizer, and laminating a protective film on one surface or both surfaces of the prepared Polarizer.

Meanwhile, recent display devices tend to be slimmer, and a thickness of a bezel unit, in which a screen is not displayed, and an edge thickness tend to be minimized in order to obtain a large screen. In addition, components such as a camera tend to be installed in a display device in order to exhibit various functions, and attempts to provide various colors in a product logo or an edge area have been tried considering design factors.

However, in an existing polarizing plate, the whole area of the polarizing plate is dyed with iodine and/or dichroic dye, therefore, the polarizing plate exhibits a dark black color, and as a result, various colors are difficult to be provided in an area that the polarizing plate is located, and particularly, when a polarizing plate is located on components such as a camera, the polarizing plate absorbs 50% or greater of the quantity of light causing a problem such as visibility decline in a camera lens.

In order to solve such a problem, a method of physically removing some areas of a polarizing plate through punching or cutting has been used. However, in this case, a problem of tearing a polarizing plate may occur during punching or cutting the polarizing plate, and such a problem becomes more serious with a recent trend of a polarizing plate becoming thinner. In addition, the punched or cut area needs to be sufficiently distant from an edge of the polarizing plate in order to punch or cut the polarizing plate without damage, however, this has a problem of not being suitable for a recent design trend of decreasing a bezel unit area.

DISCLOSURE

Technical Problem

An object of the present invention is to provide a polarizing element including locally bleached areas capable of performing functions such as installing components and/or developing colors without a physical punching or cutting process.

Technical Solution

In one aspect, the present invention provides a method for manufacturing a polarizing element including locally bleached areas including steps of providing a polarizing element including a polyvinyl alcohol-based polarizer in which at least one of iodine and dichroic dye is oriented in a certain direction; forming a mask layer including at least one punched area on one surface of the polarizing element; partially bleaching the polarizing element formed with the mask layer by immersing the polarizing element into a bleaching solution; and correcting an appearance of the partially bleached polarizing element.

Herein, the step of forming a mask layer may include steps of forming a punched area on a mask film; and attaching the mask film on one surface of the polarizing element, and herein, examples of the mask film may include, but are not limited to, an olefin-based film such as polyethylene (PE), polypropylene (PP) and polyethylene terephthalate (PET); or a vinyl acetate-based film such as ethylene vinyl acetate (EVA) and polyvinyl acetate.

Alternatively, in the present invention, the step of forming a mask layer may be carried out including steps of forming a coating layer on one surface of the polarizing element; and forming a punched area by selectively removing some areas of the coating layer, and herein, the coating layer may be formed using a polymer resin composition such as aqueous dispersive polyurethane, aqueous dispersive polyester, aqueous dispersive acrylic copolymer or a mixture thereof, or a photosensitive resin composition, and the step of forming a punched area may be carried out through laser machining.

Meanwhile, the manufacturing method of the present invention may further include a step of attaching a temporary protective film on the other side of the polarizing element, and herein, an olefin-based film such as polyethylene (PE), polypropylene (PP) and polyethylene terephthalate (PET); or a vinyl acetate-based film such as ethylene vinyl acetate (EVA) and polyvinyl acetate, and the like, may be used as the temporary protective film, however, the temporary protective film is not limited thereto.

Next, the bleaching solution used in the partially bleaching step may be a strong basic solution having a pH of 11 to 14, and more specifically, a solution including one or more types of bleaching agents selected from the group consisting of sodium hydroxide (NaOH), sodium hydrosulfide (NaSH), sodium azide (NaN$_3$), potassium hydroxide (KOH), potassium hydrosulfide (KSH) and potassium thiosulfate (KS$_2$O$_3$). Herein, the concentration of the bleaching agent in the bleaching solution may be approximately from 1% by weight to 30% by weight, preferably approximately from 5% by weight to 20% by weight, and more preferably approximately from 10% by weight to 15% by weight.

Meanwhile, the partially bleaching step is preferably carried out for 1 second to 60 seconds in the bleaching solution at 10° C. to 70° C.

Meanwhile, the manufacturing method of the present invention may further include a step of removing the mask layer after the partially bleaching step.

Next, the step of correcting an appearance of the partially bleached polarizing element may be carried out by immersing the polarizing element into a crosslinking solution, and herein, the crosslinking solution may include one or more types of crosslinking agents selected from the group consisting of boron compounds such as boric acid and borax, succinic acid, glutaric acid and citric acid.

In addition, the step of correcting an appearance of the partially bleached polarizing element may be carried out by immersing the polarizing element into a neutralizing solution, and a neutralizing agent included in the neutralizing solution may be employed without limit as long as it is known in the art. For example, according to one embodiment of the present invention, the neutralizing solution may include one or more types of neutralizing agents selected from the group consisting of sulfuric acid, nitric acid, phosphoric acid, acetic acid, citric acid, hydrochloric acid, glutaric acid and succinic acid.

Meanwhile, the manufacturing method of the present invention may further include a step of washing and drying the polarizing element after the appearance correcting step as necessary, and herein, the drying may be carried out using a heating roll having a diameter of 100ϕ to 500ϕ and preferably 150ϕ to 300ϕ, and the temperature of the heating roll may be approximately from 30° C. to 150° C. and preferably approximately from 60° C. to 150° C. In addition, the drying period using the heating roll may be approximately from 1 second to 60 seconds and preferably approximately from 1 second to 30 seconds. In the drying step, a method of drying by passing the polarizing element through an oven without passing through the heating roll may also be used. In this case, the drying temperature is approximately from 25° C. to 100° C. and preferably approximately from 30° C. to 80° C.

In addition, the manufacturing method of the present invention may further include a step of forming an optical layer on at least one surface of the polarizing element after the appearance correcting step as necessary.

In another aspect, the present invention provides a method for manufacturing a polarizing element roll including a step of winding the polarizing element including locally bleached areas formed by the manufacturing method of the present invention.

In another aspect, the present invention provides a polarizing element including locally bleached areas manufactured by the manufacturing method described above.

In another aspect, the present invention provides a method for manufacturing a single sheet-type polarizing element including steps of providing a polarizing element from a polarizing element roll manufactured as above; and cutting the polarizing element to a single sheet type. Herein, the cutting step may be carried out using a laser, and more specifically, may be carried out including steps of recognizing a location of a bleached area of the polarizing element; setting a cutting location based on the location of the bleached area; and carrying out the cutting at the cutting location using a laser.

In another aspect, the present invention provides a single sheet-type polarizing element manufactured using the manufacturing method described above.

In addition, the present invention provides a polarizing plate including the single sheet-type polarizing element.

In another aspect, the present invention provides an image display device including a display panel; and the polarizing plate described above attached to one surface or both surfaces of the display panel.

Advantageous Effects

A manufacturing method of the present invention forms bleached areas in target locations through a chemical bleaching method without a punching or cutting process, therefore, is capable of minimizing polarizing plate damage. In addition, the manufacturing method of the present invention is conducted as a continuous process, therefore, has excellent process efficiency and low manufacturing costs.

Meanwhile, the manufacturing method of the present invention carries out an appearance correcting step after a bleaching step, and therefore, minimizes deformation of a polarizing element, which may occur due to a swelling phenomenon in the bleaching process. In addition, by carrying a step of washing and drying the polarizing element after the appearance correcting step as necessary, deformation of the polarizing element can be additionally corrected.

In addition, in a method for manufacturing a single sheet-type polarizing element according to the present invention, the shape of the polarizing element can be freely formed when cutting is carried out using a laser unlike existing polarizing element cutting using a mold or a knife, and there is an advantage in that a degree of freedom is high in design.

Furthermore, when cutting a single sheet-type polarizing element, there are advantages in recognizing the location of bleached areas and cutting a polarizing element based on this recognition because they can minimize defects from the changes in the location of bleached areas in a polarizing plate, and therefore, produce products of uniform quality.

A polarizing plate manufactured according to the manufacturing method of the present invention has a depolarized area close to being transparent in an area to install components or develop colors, therefore, has an advantage of preventing performance decline of installed components and exhibiting various colors and designs.

EXPLANATION OF REFERENCE NUMERALS AND SYMBOLS

110': Polarizer Roll
110: Polarizing Element Roll
120: Mask Film Roll
120': Temporary Protective Film Roll
130: Film Laminate
140: Stripping Roll
150: Stripping Roll
160: Winding Roll
170: Roll of Polarizing Element Including Locally Bleached Areas
180: Polarizing Element Including Locally Bleached Areas
200, 2000: Laser hole drilling machine
210, 2100, 4100: Laser
220, 2200, 4200: Reflection Mirror (Scanner Mirror: X/Y Axis)
230, 2300, 4300: F-Theta Lens
2310: Focusing Lens
240, 2400, 4400: Substrate
251, 2501, 4501: Beam Expender
252, 2502, 4502: Beam Shaper
260: Scanner
300: Laminating roll
400: Bleaching Bath
500: Neutralizing Bath
510: Crosslinking Bath
600: Washing and Drying oven
620: Washing Roll
640: Drying oven
660: Heating Roll
1200: Resin Composition
1400: Light or Heat
3000: VISION Equipment
4000: Laser Equipment
5000: Stripping Roll
6000: Remainder excluding Single Sheet-type Polarizing Element
7000: Single Sheet-Type Polarizing Element

MODE FOR DISCLOSURE

Hereinafter, preferred embodiments of the present invention will be described with reference to drawings. However, embodiments of the present invention may be modified to various other forms, and the scope of the present invention is not limited to the embodiments described below. In addition, embodiments of the present invention are provided in order to more completely describe the present invention for those having average knowledge in the art.

Figure 1:
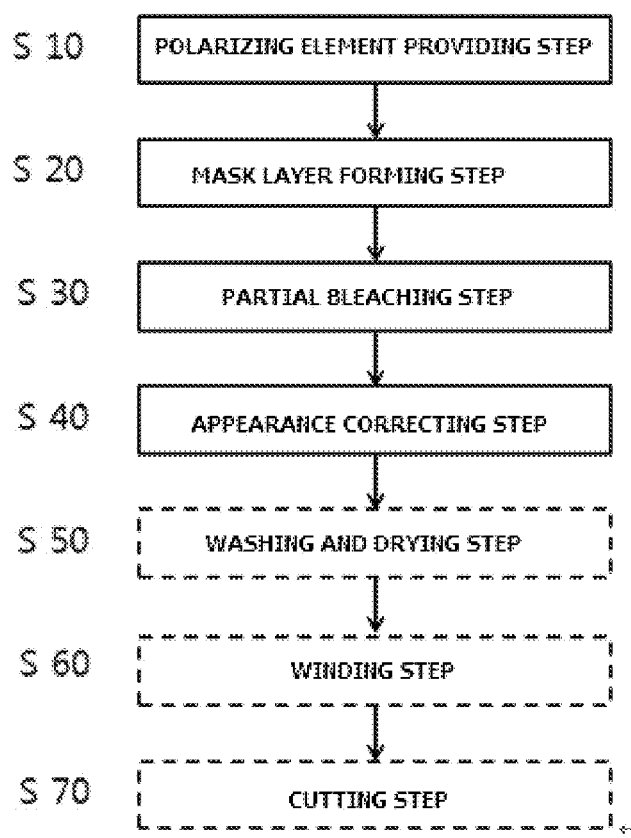
FIG. 1 is a flow chart for describing a method for manufacturing a polarizing element according to the present invention.

FIG. 1 shows a rough flow chart of a method for manufacturing a polarizing element including locally bleached areas of the present invention.

As shown in FIG. 1, a method for manufacturing a polarizing element of the present invention includes steps of providing a polarizing element including a polyvinyl alcohol-based polarizer in which at least one of iodine and dichroic dye is oriented in a certain direction (S10); forming a mask layer including at least one punched area on one surface of the polarizing element (S20); partially bleaching the polarizing element formed with the mask layer by immersing the polarizing element into a bleaching solution (S30); and correcting an appearance of the partially bleached polarizing element (S40).

"Partially bleaching" in the present specification may mean areas in a polarizing element exposed by a punched area of a mask layer being bleached. In addition, areas of a polarizing element bleached by the partially bleaching may correspond to locally bleached areas of a polarizing element.

Meanwhile, the method for manufacturing a polarizing element of the present invention may further include, as necessary, a step of washing and drying the polarizing element gone through the appearance correcting step (S50), and may further include a step of winding the polarizing element including locally bleached areas manufactured through a method such as above to prepare the polarizing element to a long polarizing element roll (S60). In addition, as necessary, a method for manufacturing a polarizing element of the present invention may further include a step of manufacturing a single sheet-type polarizing element from the long polarizing element roll (S70). Furthermore, the method for manufacturing a polarizing element of the present invention may further include a step of stripping a mask layer and a temporary protective film after, as necessary, the partially bleaching step, the appearance correcting step, or the washing and drying step.

First, in the step of providing a polarizing element (S10), the polarizing element includes a polyvinyl alcohol-based polarizer in which at least one of more of iodine and dichroic dye is oriented in a certain direction, and for example, may include a polyvinyl alcohol-based polarizer in which iodine and/or dichroic dye are oriented in a certain direction, or a film laminate including such a polyvinyl alcohol-based polarizer and a transparent polymer film attached to one surface of the polarizer. In other words, in the present invention, the polarizing element may be formed only with a polyvinyl alcohol-based polarizer, or may further include a transparent polymer film on one surface of the polyvinyl alcohol-based polarizer. Herein, the polyvinyl alcohol-based polarizer may have a thickness of approximately 1 μm to 50 μm, for example, approximately 10 μm to 30 μm or approximately 1 μm to 10 μm, and the transparent polymer film may have a thickness of approximately 1 μm to 100 μm, for example, approximately 10 μm to 70 μm.

Meanwhile, in the present invention, a polarizing element in a film roll state, in which a long polarizer film, or a laminate of a polarizer film and a transparent polymer film is wound in a roll shape, may be used as the polarizing element, and in this case, the polarizing element may be provided into a process by being unwound from such a film roll.

Meanwhile, the polyvinyl alcohol-based polarizer in which at least one of iodine and dichroic dye is oriented in a certain direction may be manufactured through a Polarizer manufacturing method well known in the art, or a commercially available polyvinyl alcohol-based polarizer may be purchased and used.

For example, the polyvinyl alcohol-based polarizer may be manufactured through steps of dyeing iodine and/or dichroic dye on an unelongated polyvinyl alcohol-based film, crosslinking the polyvinyl alcohol-based film and the iodine and/or dichroic dye, and elongating the polyvinyl alcohol-based film dyed with the iodine and/or dichroic dye. Herein, the dyeing step, the crosslinking step and the elongating step may be carried out through methods known in the art, and the methods are not particularly limited.

For example, the dyeing step may be carried out by immersing an unelongated polyvinyl alcohol-based film into a dyeing bath filled with a dyeing solution containing iodine and/or dichroic dye, or coating a dyeing solution containing iodine and/or dichroic dye on a polyvinyl alcohol-based film, and herein, water is generally used as a solvent of the dyeing solution, however, an organic solvent having compatibility with water may be mixed thereto. Meanwhile, the iodine and/or dichroic dye content in the dyeing solution, may be, while not being limited thereto, for example, approximately from 0.06 parts by weight to 0.25 parts by weight with respect to 100 parts by weight of the solvent. In addition, an auxiliary agent may be additionally included in the dyeing solution besides the iodine and/or dichroic dye in order to enhance dyeing efficiency, and iodide compounds such as potassium iodide, lithium iodide, sodium iodide, zinc iodide, aluminum iodide, lead iodide, copper iodide, barium iodide, calcium iodide, tin iodide, titanium iodide or a mixture thereof may be used as the auxiliary agent. Herein, the auxiliary agent content may be, while not being limited thereto, for example, approximately from 0.3 parts by weight to 2.5 parts by weight with respect to 100 parts by weight of the solvent, and more preferably, the weight ratio of the iodine and the iodide compound may be approximately from 1:5 to 1:10. Meanwhile, the dyeing step is preferably carried out at a temperature of approximately 25° C. to 40° C., and the period of immersion in the dyeing bath is preferably approximately from 30 seconds to 120 seconds, however, the temperature and the period are not limited thereto.

Next, the crosslinking step may be carried out by bringing a crosslinking solution into contact with the polyvinyl alcohol-based film dyed with iodine and/or dichroic dye, and the contact may be carried out through methods such as immersion, coating and spraying. Herein, the crosslinking solution is a solution including a crosslinking agent such as boron compounds such as boric acid and borax; glyoxal; glutaraldehyde; or a mixture thereof, and water is generally used as a solvent of the crosslinking solution, however, an organic solvent having compatibility with water may be mixed and used with water. The crosslinking agent content in the crosslinking solution may be, while not being limited thereto, for example, approximately from 0.5 parts by weight to 5.0 parts by weight with respect to 100 parts by weight of the solvent. Meanwhile, the crosslinking temperature and the crosslinking period are not particularly limited, and may be properly adjusted depending on the crosslinking agent content and the like. For example, the crosslinking temperature may be approximately from 45° C. to 60° C., and the crosslinking period may be approximately from 30 seconds to 120 seconds.

Next, the elongating step may be carried out through polarizer elongating methods well known in the art such as wet elongation or dry elongation, and while not being limited thereto, the elongation percentage may be from 4 times to 10 times, and the elongation temperature may be from approximately 45° C. to 60° C. Meanwhile, the elongating step may be carried out either simultaneously or separately with the dyeing step or the crosslinking step.

Meanwhile, the elongation may be carried out on a polyvinyl alcohol-based film alone, or may be carried out by laminating a substrate film on a polyvinyl alcohol-based film, and elongating the polyvinyl alcohol-based film and the substrate film together. The latter method is used in order to prevent the breakage of a polyvinyl alcohol-based film during elongation when elongating a thin polyvinyl alcohol-based film (for example, a PVA film having a thickness of 60 µm or less), and may be used to manufacture a thin Polarizer having a thickness of 10 µm or less. Herein, as the substrate film, polymer films having a maximum elongation percentage of 5 or more times under a temperature condition of 20° C. to 85° C. may be used, and examples thereof may include a high-density polyethylene film, a polyurethane film, a polypropylene film, a polyolefin film, an ester-based film, a low-density polyethylene film, a coextrusion film of high-density polyethylene and low-density polyethylene, a copolymer resin film containing ethylene vinyl acetate in high-density polyethylene, an acrylic film, a polyethylene terephthalate film, a polyvinyl alcohol-based film, a cellulose-based film, and the like. Meanwhile, the maximum elongation percentage means an elongation percentage immediately before breakage. Herein, the laminating method of the substrate film and the polyvinyl alcohol-based film is not particularly limited. For example, the substrate film and the polyvinyl alcohol-based film may be laminated with an adhesive or a gluing agent as a medium, or may be laminated by placing the polyvinyl alcohol-based film on the substrate film without a separate medium. Alternatively, the lamination may be carried out by coextruding a resin forming the substrate film and a resin forming the polyvinyl alcohol-based film, or by coating a polyvinyl alcohol-based resin on the substrate film. Meanwhile, the substrate film may be removed by being released from a polarizer after completing the elongation, however, the process may be progressed to a next step without removing the substrate film. In this case, the substrate film may be used as a temporary protective film, a mask film or a polarizer protective film to be described later.

Meanwhile, a polarizing element including a film laminate in which a polyvinyl alcohol-based polarizer and a transparent polymer film are laminated may be manufactured using a method of attaching a transparent polymer film on one surface of the polyvinyl alcohol-based film prepared through a method such as above. Herein, as the transparent polymer film, an acetate-based such as triacethyl cellulose (TAC), an acrylic-based, a polyester-based, a polyethersulfone-based, a polycarbonate-based, a polyamide-based, a polyimide-based, a polyolefin-based resin film and the like may be used, however, the transparent polymer film is not limited thereto. Meanwhile, the transparent polymer film may be attached through film lamination methods well known in the art, and for example, lamination may be carried out by adhering the polyvinyl alcohol-based polarizer and the transparent polymer film with an adhesive well known in the art such as a water-based adhesive such as a polyvinyl alcohol-based adhesive, a heat-curable adhesive such as an urethane-based adhesive, a photocation-curable adhesive such as an epoxy-based adhesive, a photoradical-curable adhesive such as an acryl-based adhesive as a medium, and then curing the adhesive by heat or active energy ray irradiation.

In this step, a protective film may be laminated on one surface of the polyvinyl alcohol-based polarizer to perform a role of protecting the appearance of the polarizer. Specifically, when a transparent polymer film is laminated on one surface of the polyvinyl alcohol-based polarizer, a protective film is laminated on the surface on which the transparent polymer film is not laminated. As the protective film, an olefin-based film such as polyethylene (PE), polypropylene (PP) and polyethylene terephthalate (PET); or a vinyl acetate-based film such as ethylene vinyl acetate (EVA) and polyvinyl acetate may be used, however, the protective film is not limited thereto. The protective film may be stripped off after performing a role of protecting the appearance of a polarizer. Specifically, in a polarizing element, when a mask film is laminated on one surface of a polarizer and a protective film is laminated on the other surface in a step of forming a mask layer, the step of forming a mask layer needs to be carried out after stripping of the protective film.

Next, when a polarizing element such as above is provided, the step of forming a mask layer including at least one punched areas on one surface of the polarizing element (S20) is carried out. Herein, the mask layer may be formed with a mask film or a coating layer, and when a substrate film or a transparent polymer film is attached on one surface of the polarizing element, the mask layer is formed on the surface on which the films are not attached. As described above, when a protective film is attached on one surface of the polarizer, the mask layer is formed after stripping off the protective film.

When using a mask film as a mask layer, the step of forming a mask layer (S20) may include steps of forming a punched area on a mask film; and attaching the mask film on one surface of the polarizing element.

Herein, as the mask film, an olefin-based film such as polyethylene (PE), polypropylene (PP) and polyethylene terephthalate (PET); or a vinyl acetate-based film such as ethylene vinyl acetate (EVA) and polyvinyl acetate may be used, however, the mask film is not limited thereto. In addition, the mask film may have a thickness of, while not being limited thereto, approximately from 10 μm to 100 μm, and preferably approximately from 10 μm to 70 μm.

Meanwhile, the step of forming a punched area on a mask film is not particularly limited, and film punching methods well known in the art such as mold machining, knife machining or laser machining may be used. Among these, laser machining is particularly preferable in that the shape of the punched area may be freely machined.

Herein, the laser machining may be carried out using laser machining equipment generally known in the art, and is not particularly limited. The condition of the laser machining such as a laser equipment type, output and a laser pulse repetition rate may be different depending on the quality of the material and the thickness of the film, the shape of the punched area and the like, and those skilled in the art may suitably select a laser machining condition considering factors such as above. For example, when using a polyolefin film having a thickness of 30 μm to 100 μm as a mask film, a punched area may be formed using carbon dioxide ($CO_2$) laser equipment having a peak wavelength of approximately 9 μm to 11 μm or an ultraviolet (UV) device having a peak wavelength of approximately 300 nm to 400 nm, and herein, the maximum average output of the laser equipment may be approximately from 0.1 W to 30 W, and the pulse repetition rate may be from approximately 0 kHz to 50 kHz, however, the condition is not limited thereto.

Meanwhile, the step of forming a punched area may be carried out either before or after the step of attaching a mask film on the polarizing element. In other words, after forming a punched area on a mask film in advance, the mask film formed with the punched area may be attached to the polarizing element (refer to FIG. 2), or a punched area may be formed after attaching a mask film on a polarizing element (refer to FIG. 3).

Meanwhile, the step of attaching the mask film on one surface of the polarizing element may be carried out using film lamination methods well known in the art, for example, a method of attaching the mask film and the polarizing element through a gluing layer, and herein, the gluing layer may be formed by coating a gluing agent such as an acryl-based gluing agent, a silicone-based gluing agent, an epoxy-based gluing agent and a rubber-based gluing agent on the mask film or the polarizing element, however, the method is not limited thereto. For example, when using films having self-gluing strength as a mask film (for example, EVA film, PVAC film, PP film and the like), the mask film may be directly attached to one surface of the polarizing element without forming a gluing layer.

Meanwhile, when the mask layer is formed by a coating layer, the step of forming a mask layer (S20) may be carried out including steps of forming a coating layer on one surface of the polarizing element; and forming a punched area by selectively removing some area of the coating layer.

Herein, the step of forming a coating layer may be carried out using a method of coating a composition for forming a coating layer on one surface of the polarizing element and drying the result, or curing a coating layer by heat or irradiation of an active energy ray such as an ultraviolet ray and an electron beam.

Herein, as the composition for forming a coating layer, those that are capable of being etched by a laser and not dissolved in an alkali solution may be used, and the type is not particularly limited. For example, a composition including an aqueous dispersive polymer resin such as aqueous dispersive polyurethane, aqueous dispersive polyester and aqueous dispersive acrylic copolymer, or a photosensitive resin composition may be used as the composition for forming a coating layer. Meanwhile, as the photosensitive resin composition, commercially-available photosensitive resin compositions such as a positive-type photoresist or a negative-type photoresist may be used, however, the photosensitive resin composition is not particularly limited.

Meanwhile, the method of coating the composition for forming a coating layer is not particularly limited, and coating methods generally used in the art such as bar coating, spin coating, roll coating, knife coating and spray coating may be used, and the curing may be carried out by applying heat or by irradiating an active energy ray such as an ultraviolet ray and an electron beam on the coated resin composition.

Herein, the coating layer preferably has a thickness of approximately 100 nm to 500 nm. When the coating layer thickness satisfies the above-mentioned range, there are advantages in that damage on a Polarizer occurring during punched area machining may be prevented, and an additional process of removing the coating layer may not be carried out after the bleaching process.

Meanwhile, the step of forming a punched area by selectively removing part of the coating layer may be carried out using an evaporation method by irradiating an energy ray on some areas of the coating layer, or a photolithography method.

Herein, the method of evaporating part of the coating layer may be carried out using laser equipment generally known in the art such as ultraviolet laser equipment having a peak wavelength of approximately 300 nm to 400 nm, infrared laser equipment having a peak wavelength of approximately 1000 nm to 1100 nm, or green laser equipment having a peak wavelength of approximately 500 nm to 550 nm. Meanwhile, a laser machining condition such as the type of laser equipment used, a laser output average power and a pulse repetition rate may be different depending on the type and thickness of the coating layer, and the shape of a punched area to form, and those skilled in the art may properly select a laser machining condition considering factors such as above.

Meanwhile, when the coating layer is formed with a photosensitive resin composition, a punched area may be formed through a photolithography process, and for example, a punched area may be formed using a method of coating a photosensitive resin composition on one surface of the polarizing element, selectively exposing an energy ray of the area corresponding to the punched area, and then developing the result using a developing solution.

Herein, the exposure may be carried out using a light source such as ultraviolet ray, or using an energy ray such as a laser. When exposure is carried out using a laser, there is an advantage in that a separate mask does not have to be used for the exposure, and the shape of a punched area may be relatively freely formed.

More specifically, when a coating layer is formed to a thickness of 200 nm using a photosensitive resin composition in the present invention, exposure may be carried out using an ultraviolet laser having a maximum output average power of approximately 0.1 W to 10 W and a peak wavelength of 300 nm to 400 nm, and a laser operated pulse repetition rate at the time may be approximately from 30 kHz to 100 kHz.

Meanwhile, in the developing, a suitable developing solution may be selected and used depending on the type of a photosensitive resin used, and in some cases, a bleaching solution to be described later may be used as the developing solution. In this case, a separate developing step may not be carried out.

Meanwhile, the punched area may be formed so as to cope with the form of an area to bleach, and the shape or forming location is not particularly limited. For example, the punched area may be formed on the location at which a component such as a camera is installed so as to cope with the shape of the component, may be formed to have a product logo shape in an area in which the product logo is printed, or may be formed in a frame form on the edge part of the polarizing element when attempting to provide a color on the edge part of the polarizing element.

Meanwhile, the manufacturing method of the present invention may further include a step of attaching a temporary protective film on the other surface of the polarizing element after the step of providing the polarizing element. The step of attaching a temporary protective film is a step of attaching a temporary protective film on the surface opposite to the surface on which a mask layer of a polarizing element is formed in order to protect the polarizing element in a partially bleaching step (S30) to be described later, and the step of attaching a temporary protective film is preferably carried out before the bleaching step in order to perform the role of a temporary protective film. However, the process is not limited thereto, and the step of attaching a temporary protective film may not be included.

Meanwhile, as the temporary protective film, an olefin-based film such as polyethylene (PE), polypropylene (PP) and polyethylene terephthalate (PET); or a vinyl acetate-based film such as ethylene vinyl acetate (EVA) and polyvinyl acetate may be used, however, the temporary protective film is not limited thereto.

Meanwhile, the temporary protective film and the polarizing element may be attached using film lamination methods well known in the art such as a method of attaching the temporary protective film and the polarizing element through a gluing layer. Herein, the gluing layer may be formed by coating a gluing agent such as an acryl-based gluing agent, a silicone-based gluing agent, an epoxy-based gluing agent and a rubber-based gluing agent on the temporary protective film or the polarizing element, however, the method is not limited thereto. For example, when using films having self-gluing strength as a temporary protective film (for example, EVA film, PVAC film, PP film and the like), the temporary protective film may be directly attached to the polarizing element without forming a gluing layer.

Next, a step of partially bleaching the polarizing element in which the mask layer including the punched area is formed through a process such as above is carried out by immersing the polarizing element into a bleaching solution (S30).

In this step, a bleaching process is carried out by immersing the polarizing element into a bleaching solution as described above. When using an immersion process, there is an advantage in that a treatment period may be properly adjusted when a temperature or concentration changes due to a short treatment period unlike a coating process in which a treatment period is difficult to be properly adjusted to match circumstances. In other words, when carrying out a bleaching process using an immersion process, there is an advantage in that a treatment period may be adjusted as necessary.

Herein, the bleaching solution is a solution including a bleaching agent capable of bleaching iodine and/or dichroic dye, and herein, the bleaching agent may be a bleaching agent capable of bleaching iodine and/or dichroic dye, and is not particularly limited, however, examples thereof may include one or more types selected from the group consisting of sodium hydroxide (NaOH), sodium hydrosulfide (NaSH), sodium azide ($NaN_3$), potassium hydroxide (KOH), potassium hydrosulfide (KSH) and potassium thiosulfate ($KS_2O_3$).

Meanwhile, the concentration of the bleaching agent in the bleaching solution may be approximately from 1% by weight to 30% by weight, preferably approximately from 5% by weight to 20% by weight, and more approximately from 10% by weight to 15% by weight. When the bleaching agent content is less than 1% by weight, bleaching may not occur, or time taken for bleaching becomes longer causing deformation of the polarizing element due to swelling, and when the bleaching agent concentration is greater than 30% by weight, economic feasibility decreases since the amount of an increase in bleaching efficiency is insignificant.

Meanwhile, water, or a mixed solvent of water and alcohol may be used as a solvent of the bleaching solution, and herein, methanol, ethanol, butanol, isopropyl alcohol and the like may be used either alone or as a mixture thereof as the alcohol.

Meanwhile, the bleaching solution is more preferably a strong basic solution having a pH of 11 to 14 and preferably 13 to 14. When such a strong basic solution is used, bleaching may be smoothly achieved since boric acid cross-linking bonds between polyvinyl alcohol, and iodine and/or dichroic dye are destroyed.

Meanwhile, the partially bleaching step is preferably carried out for 1 second to 60 seconds in a bleaching solution at 10° C. to 70° C. When the temperature of the bleaching solution and the immersion period are outside the above-mentioned ranges, there may be problems in that swelling and irrigation occur in a polarizer due to the bleaching solution causing a curve in the polarizer, bleaching occurs even in undesired areas, or the like.

When a polarizing element in which a mask layer including a punched area is immersed into a bleaching solution as described above, a bleaching solution is in contact with a polyvinyl alcohol-based polarizer through the punched area, and as a result, partially bleaching occur only on the parts corresponding to the punched area areas.

When such a partially bleaching process is complete, a step of washing the bleaching solution (not shown) may be carried out as necessary. This is due to the fact that, when a bleaching solution remains in a polarizing element, polarizer bleaching may occur in a post-process in undesired areas due to the residual bleaching solution. Herein, the washing may be carried out using a method of immersing the polarizing element into alcohol, an aqueous acid solution or purified water, or dropping alcohol, an aqueous acid solution or purified water on the polarizing element, and herein, examples of the alcohol may include ethanol, methanol, propanol, butanol, isopropyl alcohol or a mixture thereof, and examples of the acid solution may include an aqueous acetic acid solution, an aqueous adipic acid solution, an aqueous boric acid solution, an aqueous phosphoric acid solution, an aqueous lactic acid solution, an aqueous sulfuric acid solution, an aqueous nitric acid solution or a mixed solution thereof, but are not limited thereto. The washing step is preferably carried out for approximately 1 second to 180 seconds and preferably for approximately 3 seconds to 60 seconds.

Meanwhile, a step of removing the mask layer may be additionally carried out after the partially bleaching step as necessary. The step of removing the mask layer may be carried out using a method of stripping off the mask layer from the polarizing element. When using a mask film as the mask layer, this step is preferably carried out, however, when using a coating layer as the mask layer, this step may not be carried out. More specifically, the step of removing the mask layer may be carried out using a method of stripping of the mask layer from the polarizing element using a stripping roll and the like. Preferably, the step of removing the mask layer may be carried out after an appearance correcting step (S40) or a washing and drying step to be described later.

Next, a step of correcting an appearance of the partially bleached polarizing element (S40) is carried out. A polarizing element partially bleached by being immersed in a bleaching solution has a problem in that the shape of the polarizing element changes due to the occurrence of swelling in the bleached part due to the bleaching solution. This step is for recovering the deformed shape of the polarizing element as above. In other words, the appearance correcting step is a step of recovering the appearance of the polarizing element deformed by the bleaching solution.

According to one embodiment of the present invention, the appearance correcting step may be carried out by immersing the polarizing element into a crosslinking solution. In other words, the appearance correcting step may include a crosslinking step.

Herein, the crosslinking solution includes one or more types of crosslinking agents selected from the group consisting of boron compounds such as boric acid and borax; and an acid such as succinic acid, glutaric acid and citric acid, and herein, the crosslinking agent content may be different depending on the type of the crosslinking agent, however, the content may be, for example, approximately from 0.001% by weight to 20% by weight, preferably approximately from 0.003% by weight to 15% by weight, and more preferably approximately from 0.005% by weight to 10% by weight. More preferably, the crosslinking agent content may be approximately from 0.001% by weight to 5% by weight when using a boron compound as the crosslinking agent, and the crosslinking agent content may be approximately from 0.001% by weight to 1% by weight when using an acid as the crosslinking agent. When the crosslinking agent content satisfies the above-mentioned range, a process yield, quality of the polarizing plate appearance, optical properties, durability and the like are excellent. Meanwhile, water (purified water) may be used as a solvent of the crosslinking solution.

Meanwhile, although not being mandatory, an iodide compound such as potassium iodide, lithium iodide, sodium iodide, zinc iodide, aluminum iodide, lead iodide, copper iodide, barium iodide, calcium iodide, tin iodide, titanium iodide or a mixture thereof may be additionally included to the crosslinking solution in order to control physical properties and colors of a polarizing plate. Herein, the iodide compound content is preferably approximately from 3% by weight to 5% by weight. The iodide compound content being outside the above-mentioned range may have an adverse effect on heat resistance and color properties of the polarizer.

Meanwhile, the temperature of the crosslinking solution during the crosslinking may be, while not being limited thereto, for example, approximately from 10° C. to 70° C., preferably approximately from 15° C. to 65° C., and more preferably approximately from 20° C. to 60° C. When the temperature of the crosslinking solution satisfies the above-mentioned range, polarizing element deformation due to bleaching may be effectively corrected, and when the temperature is outside the above-mentioned range, optical properties or appearance quality of the polarizing element may be degraded, and in severe cases, polarizing element deformation may become worse.

In addition, the crosslinking period may be, while not being limited thereto, for example, approximately from 1 second to 120 seconds, preferably approximately from 1 second to 90 seconds, and more preferably approximately from 1 second to 60 seconds. When the crosslinking period satisfies the above-mentioned range, polarizing element deformation due to bleaching may be effectively corrected, and when the crosslinking period is outside the above-mentioned range, optical properties or quality of the polarizing element may be degraded, and in severe cases, polarizing element deformation may become worse.

When immersing the polarizing element into a crosslinking solution including a crosslinking agent as above, an effect of correcting the polarizing element deformation may be obtained as polyvinyl alcohol chains of the PVA film bond to each other by a boron compound or acid included in the crosslinking solution. According to the research results of the inventors of the present invention, a dimensional deformation rate in the bleached part is shown to decrease by 10% to 70% and generally up to approximately by 20% to 60% when crosslinking is carried out after the bleaching step compared to a case in which no crosslinking is carried out.

According to one embodiment of the present invention, the appearance correcting step may be carried out by immersing the polarizing element into a neutralizing solution. In other words, the appearance correcting step may include a neutralizing step.

Herein, the neutralizing solution includes a neutralizing agent, and the neutralizing agent may employ those known in the art without limit. For example, the neutralizing solution includes one or more types of neutralizing agents selected from the group consisting of sulfuric acid, nitric acid, phosphoric acid, acetic acid, citric acid, hydrochloric acid, glutaric acid and succinic acid, and herein, the neutralizing agent content may be different depending on the type of the neutralizing agent, however, the content may be approximately from 0.001% by weight to 20% by weight, preferably approximately from 0.003% by weight to 15% by weight, and more approximately from 0.005% by weight to 10% by weight. More preferably, the neutralizing agent content may be approximately from 0.01% by weight to 10% by weight when using acetic acid or citric acid. When the neutralizing agent content satisfies the above-mentioned range, a process yield, quality of the polarizing plate appearance, optical properties, durability and the like are excellent. Meanwhile, water (purified water) may be used as a solvent of the neutralizing solution.

The temperature and the neutralizing period of the neutralizing solution, the same details on the temperature and the crosslinking period of the crosslinking solution described above may be applied, respectively. Specifically, the temperature of the neutralizing solution in the neutralization may be, while not being limited thereto, for example, from 5° C. to 70° C. In addition, the neutralizing period may be, while not being limited thereto, for example, approximately from 3 seconds to 30 seconds.

When immersing the polarizing element into a neutralizing solution as above, an effect of correcting the deformation of the polarizing element appearance caused by bleaching may be obtained as a cation of the basic solution used in the bleaching step (S30) is removed by the neutralization.

In addition, according to one embodiment of the present invention, the appearance correcting step may include a crosslinking step and a neutralizing step. Specifically, a crosslinking step may be carried out after carrying out a neutralizing step, and in this case, an effect of correcting the appearance deformation may be obtained by neutralization, and an effect of fixing the correction may be obtained through crosslinking.

According to the research results of the inventors of the present invention, a dimensional deformation rate in the bleached part is shown to decrease by 10% to 70% and generally up to approximately by 20% to 60% when such an appearance correcting step is carried out after the bleaching step compared to a case in which no appearance correcting step is carried out.

Specifically, the thickness of the polarizing element becomes thicker by approximately 5% to 30% when bleaching is carried out compared to before the bleaching, and the appearance of the polarizing element is deformed to a shape in which the bleaching part rises due to the thickness difference with the surrounding parts. Carrying out the appearance correcting step after the bleaching step is effective in decreasing the thickness of the polarizing element up to approximately by 5% to 30% again, and the thickness is shown to be similar to the thickness before the bleaching step, therefore, an appearance correction effect is exhibited as the thickness difference with the surrounding parts decreases. According to the research results of the inventors of the present invention, it is seen that, when the neutralizing step is carried out after the bleaching step, the degree of being deformed to a shape in which the bleaching part rises is reduced by approximately 7% to 22% compared to a case in which only washing with purified water is carrying out.

In addition, the surface opposite to the surface that is deformed to have a risen shape among the bleaching parts of the polarizing element has a sunken shape compared to the surrounding parts due to contractional deformation of the polarizing element after the bleaching, however, carrying out the appearance correcting step after the bleaching step reduces such a phenomenon, and an effect of appearance correction is exhibited. Specifically, according to the research results of the inventors of the present invention, it is seen that, when the neutralizing step is carried out after the bleaching step, the degree of appearance deformation of sagging down compared to the surrounding parts is reduced by approximately 60% to 80% compared to a case in which only washing with purified water is carrying out.

After completing the appearance correcting step as above, a step of washing and drying the polarizing element (S50) may be additionally carried out as necessary. This step is for washing the crosslinking solution and/or neutralizing solution remaining in the polarizing element, and additionally correcting the deformation of the polarizing element appearance caused by the bleaching solution, and washing and drying methods of polarizing elements known in the art may be used.

For example, the washing and drying step may be carried out using a method of passing the polarizing element through a washing roll and a heating roll, and herein, the heating roll may have a diameter of approximately 100ϕ to 500ϕ, and preferably approximately 150ϕ to 300ϕ. The temperature of the heating roll may be approximately from 30° C. to 150° C., and preferably approximately from 60° C. to 150° C. In addition, the drying period using the heating roll may be approximately from 1 second to 60 seconds, and preferably approximately from 1 second to 30 seconds. According to the research results of the inventors of the present invention, an effect of correcting the deformation of the polarizing element appearance is different depending on the diameter and the temperature of the heating roll in the washing and drying step, and when the diameter and the temperature of the heating roll satisfy the above-mentioned ranges, deformation of the polarizing element appearance is shown to be most effectively corrected. In the drying step, drying may be carried out by passing the polarizing element through a drying oven without passing through the heating roll. In this case, the drying temperature may be from approximately 25° C. to 100° C., and preferably approximately from 30° C. to 80° C.

According to one embodiment of the present invention, the drying in the washing and drying step may use a method of passing the polarizing element through a drying oven.

In addition, the manufacturing method of the present invention may include, although not being mandatory, a step of forming a planarization layer on one side of the Polarizer after the appearance correcting step in order to additionally enhance surface smoothness of the polarizing element. Herein, the planarization layer is preferably formed on the surface that is in contact with the bleaching solution (that is, the surface on which the mask layer is formed), and the thickness is approximately from 1 μm to 10 μm, and more preferably approximately from 2 μm to 5 μm.

In addition, the manufacturing method of the present invention may further include, although not being mandatory, a step of forming an optical layer on at least one surface of the polarizing element after the appearance correcting step as necessary. Herein, the optical layer may be a polymer film layer such as a protective film or a retardation film, may be a functional film layer such as a brightness enhancement film, may be a functional layer such as a hard coating layer, an anti-reflection layer, an adhesive layer and a gluing layer, or may be a combination thereof.

Meanwhile, the optical layer may be directly attached or formed on the surface of the polyvinyl alcohol polarizer, or, when a film or a coating layer is formed on one surface of the polyvinyl alcohol polarizer, may be attached on the film or the coating layer.

The method of forming the optical layer may be different depending on the type of the optical layer to form, and for example, methods of forming an optical layer well known in the art may be used, and the method is not particularly limited.

In another aspect, the present invention provides a polarizing element including locally bleached areas manufactured through processes such as above. In other words, one embodiment of the present invention provides a polarizing element including locally bleached areas manufactured using the method for manufacturing a polarizing element described above. The locally bleached area may be a depolarized area. The depolarized area has single transmittance of 80% or greater, preferably 85% or greater and more preferably 90% or greater in a wavelength band of 400 nm to 800 nm and more preferably 450 nm to 750 nm, which is a visible region. In addition, the depolarized area has a polarization degree of 10% or less and more preferably 5% or less. As the depolarized area has higher single transmittance and a lower polarization degree, visibility is enhanced, and performances and image qualities of a camera lens to be located in the area may be further enhanced.

"Single transmittance" in the present specification is expressed as an average value of transmittance of an absorption axis and transmittance of a transmittance axis in a polarizing plate. In addition, "single transmittance" and "polarization degree" in the present specification are values measured using a V-7100 model manufactured by JASCO.

Meanwhile, the polarizing element including locally bleached areas of the present invention manufactured through processes such as above may have the form of a long film, and a roll of the polarizing element including locally bleached areas may be manufactured by winding the polarizing element.

Figure 2:
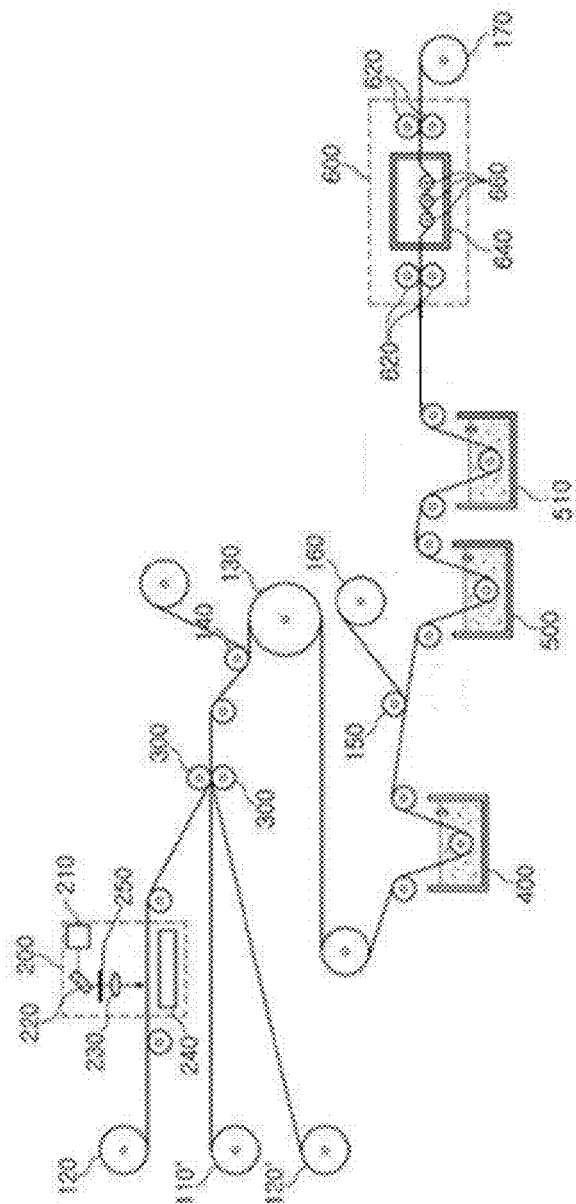
FIG. 2 is a diagram showing a first embodiment of a method for manufacturing a polarizing element according to the present invention.
Figure 3:
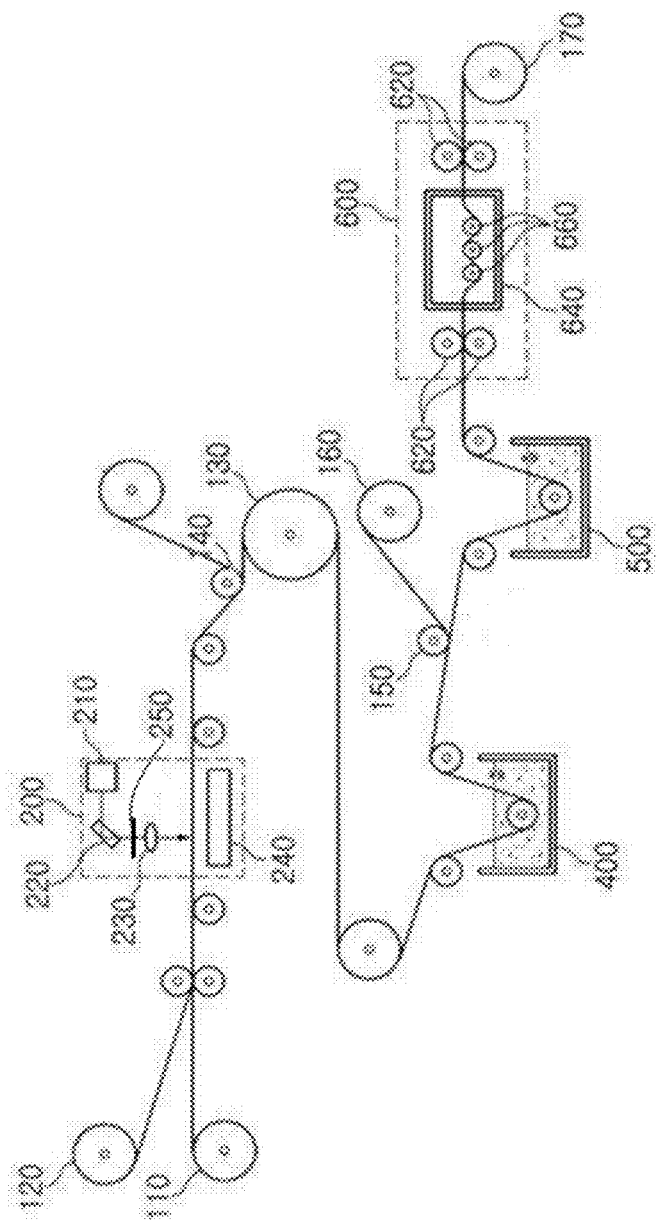
FIG. 3 is a diagram showing a second embodiment of a method for manufacturing a polarizing element according to the present invention.
Figure 4:
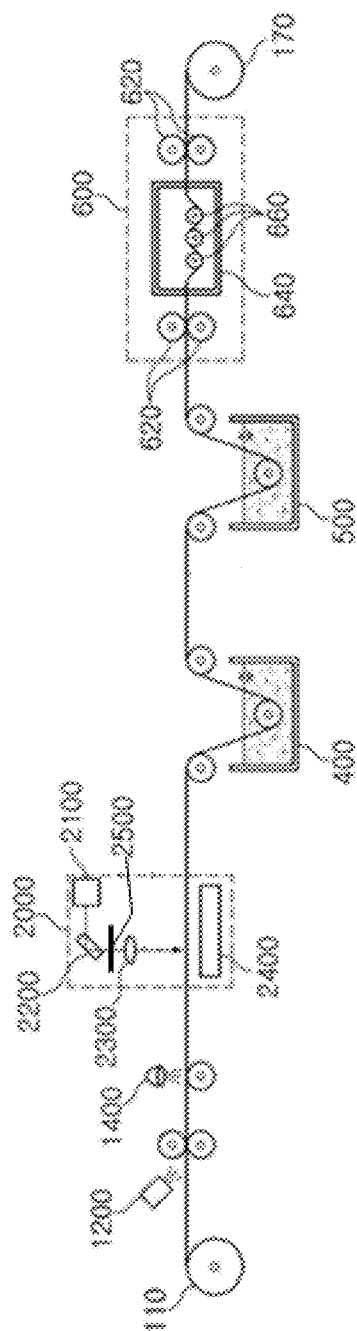
FIG. 4 is a diagram showing a third embodiment of a method for manufacturing a polarizing element according to the present invention.

FIG. 2 to FIG. 4 are diagrams showing specific embodiments of the methods for manufacturing the polarizing element of the present invention. Hereinafter, the present invention will be described in more detail with reference to FIG. 2 to FIG. 4. However, the following descriptions on FIG. 2 to FIG. 4 relate to only one embodiment of the present invention, and the scope of the present invention is not limited thereto.

FIG. 2 is a diagram showing a first embodiment of the method for manufacturing a polarizing element of the present invention. According to the first embodiment of the present invention, the method for manufacturing a polarizing element including locally bleached areas of the present invention includes steps of providing a polyvinyl alcohol-based polarizer in which at least one of iodine and dichroic dye is oriented in a certain direction, a mask film and a temporary protective film; machining a punched area in the mask film; forming a film laminate by laminating the mask film, the polarizer and the temporary protective film; partially bleaching the film laminate by immersing the film laminate into a bleaching bath; removing the mask film and the temporary protective film from the film laminate; correcting the appearance of the partially bleached polarizer (a crosslinking step by immersing the polarizer into a crosslinking bath and/or a neutralizing step); and washing and drying the polarizer gone through the appearance correcting step. Meanwhile, as necessary, a polarizing element roll may be manufactured by winding the polarizer including locally bleached areas manufactured as above. Herein, the step of removing the mask film and the temporary protective film from the film laminate may be carried out, as necessary, after the appearance correcting step or the washing and drying step.

First, from a roll winding a polyvinyl alcohol-based polarizer in which at least one of iodine and dichroic dye is oriented in a certain direction (110'), a roll winding a mask film (120) and a roll winding a temporary protective film (120'), the polarizer, the mask film and the temporary protective film are unwound, respectively. Each process may be carried out in one process, or carried out in a separate process.

Next, a step of machining a punched area in the mask film, and a step of forming a film laminate by laminating the mask film, the polarizer and the temporary protective film are carried out. In FIG. 2, machining a punched area in the mask film is carried out before laminating the polarizer, the mask film and the temporary protective film, however, the process is not limited thereto, and machining a punched area may be carried out after laminating the polarizer, the mask film and the temporary protective film.

Figure 6A:
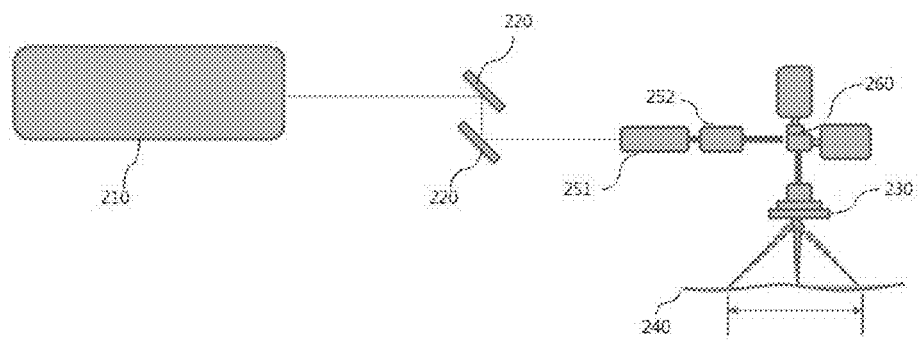
FIG. 6a is a diagram showing one example of a specific structure of laser hole drilling machine in FIG. 2, FIG. 3 and FIG. 4.

Meanwhile, the punched area machining may be carried out using laser hole drilling machine (200) as shown in FIG. 2, however, the method is not limited thereto, and a mold or a knife may be used. Constituents of the laser hole drilling machine (200) are not particularly limited as long as they are known in the art, and for example, a laser (210), a reflection mirror (220), an F-Theta lens (230), a beam expender (251), a beam shaper (252), a substrate (240) and the like may be included. The substrate is a target for laser hole drilling machine application, and in this case, the substrate may be the mask film. Specifically, the beam shaper (252) and the beam expender (251) may be inserted between the reflection mirror (220) and the F-Theta lens (230). In the drawing, only one is located between the reflection mirror (220) and the F-Theta lens (230), however, any one of the beam shaper (252) and the beam expender (251) may be used alone, or both may be used. A specific structure of the laser hole drilling machine (200, 2000) is shown in FIG. 6*a*. FIG. 6*a* may be a specific structure of laser hole drilling machine of FIG. 3 and FIG. 4 to be described later. Meanwhile, when machining a punched area using laser hole drilling machine (200), the area corresponding to the punched area forms a perforated line due to the laser, however, the area is not yet separated from the mask film. Therefore, a process of removing the mask film piece present in the area corresponding to the punched area is required. Removing the film piece may be carried out using a stripping roll (140) and the like, and removing the film piece is preferably carried out after the film lamination when the punched area machining is carried out before the film lamination, however, the process is not limited thereto.

When a film laminate (130) of a mask film formed with a punched area/a polarizer/a temporary protective film is formed through a process such as above, the polarizer is partially bleached by immersing the film laminate into a bleaching bath (400) filled with a bleaching solution. When the bleaching process is complete, the mask film and the temporary protective film are removed by being stripped off from the film laminate. Herein, the stripping may be carried out through a stripping roll (150) and the like, however, the method is not limited thereto, and the stripped mask film and temporary protective film may be wound on a separate roll (160). Meanwhile, the stripping of the mask film and the temporary protective film may be carried out after the appearance correcting step or after the washing and drying step unlike the sequence shown in FIG. 2. The partially bleached polarizer is neutralized by being immersed into a neutralizing bath (500) filled with a neutralizing solution, or crosslinked by being immersed into a crosslinking bath (510) filled with a crosslinking solution. Alternatively, both the neutralization and the crosslinking may be carried out. When neutralization and/or crosslinking are complete, the polarizer is washed and dried by being passed through a washing roll (620) and a heating roll (660). Next, a roll of the polarizing element including locally bleached areas is manufactured by winding the dried polarizer on a roll. Meanwhile, although not shown in the drawings, a step of laminating an optical film on one surface or both surfaces of the polarizer and/or forming an optical layer such as a hard coating layer, an anti-reflection layer, an adhesive layer or a gluing layer may be additionally carried out before winding the polarizer on a roll.

FIG. 3 is a diagram showing a second embodiment of the method for manufacturing a polarizing element of the present invention. According to the second embodiment of the present invention, the method for manufacturing a polarizing element including locally bleached areas of the present invention includes steps of providing a polarizing element including a polyvinyl alcohol-based polarizer in which at least one of iodine and dichroic dye is oriented in a certain direction and a transparent polymer film attached on one surface of the polarizer, and a mask film; machining a punched area in the mask film; forming a film laminate by laminating the polarizing element and the mask film; partially bleaching the film laminate by immersing the film laminate into a bleaching bath; removing the mask film from the film laminate (may be carried out after the appearance correcting step or after the washing and drying step); correcting the appearance by immersing the partially bleached polarizing element into a neutralizing bath or a crosslinking bath, or immersing the partially bleached polarizing element into a neutralizing bath and then a crosslinking bath; and washing and drying the crosslinked polarizing element. Meanwhile, as necessary, a polarizing element roll may be manufactured by winding the polarizing element including locally bleached areas manufactured as above.

First, from a roll winding a polarizing element including a polyvinyl alcohol-based polarizer in which at least one of iodine and dichroic dye is oriented in a certain direction and a transparent polymer film attached to one surface of the polarizer (110) and a roll winding a mask film (120), the polarizing element and the mask film are unwound, respectively.

Next, a step of machining a punched area in the mask film, and a step of forming a film laminate by laminating the mask film and the polarizing element are carried out. In FIG. 3, machining a punched area in the mask film is carried out after laminating the polarizing element and the mask film, however, the process is not limited thereto, and machining a punched area may be carried out before laminating the polarizing element and the mask film.

Meanwhile, the punched area machining may be carried out using laser hole drilling machine (200) as shown in FIG. 3, however, the method is not limited thereto, and a mold or a knife may be used. Meanwhile, when machining a punched area using laser hole drilling machine (200), the area corresponding to the punched area forms a perforated line due to the laser, however, the area is not yet separated from the mask film. Therefore, a process of removing the mask film piece present in the area corresponding to the punched area is required. Removing the film piece may be carried out using a stripping roll (140) and the like, and removing the film piece is preferably carried out after the film lamination when the punched area machining is carried out before the film lamination, however, the process is not limited thereto.

When a film laminate (130) of a mask film formed with a punched area/a polarizing element is formed through a process such as above, the polarizing element is partially bleached by immersing the film laminate into a bleaching bath (400) filled with a bleaching solution. When the bleaching process is complete, the mask film is removed by being stripped off from the film laminate. Herein, the stripping may be carried out through a stripping roll (150) and the like, however, the method is not limited thereto, and the stripped mask film may be wound on a separate roll (160). (As described above, the mask film stripping process may be carried out after the appearance correcting step or after the washing and drying step.) After that, the polarizer is neutralized by being immersed into a neutralizing bath (not shown) filled with a neutralizing solution, or crosslinked by being immersed into a crosslinking bath (510) filled with a crosslinking solution, and when neutralization and/or crosslinking are complete, the polarizing element is washed and dried by being passed through a washing roll (620) and a heating roll (660). Next, a roll of the polarizing element including locally bleached areas is manufactured by winding the dried polarizing element on a roll. Meanwhile, although not shown in the drawings, a step of laminating an optical film on one surface or both surfaces of the polarizing element and/or forming an optical layer such as a hard coating layer, an anti-reflection layer, an adhesive layer or a gluing layer may be additionally carried out before winding the polarizing element on the polarizing element roll. FIG. 3 does not show a neutralizing bath, however, as described above, the appearance correcting step may include a step of immersion into a neutralizing bath and/or a step of immersion into a crosslinking bath.

FIG. 4 is a diagram showing a third embodiment of the method for manufacturing a polarizing element of the present invention. According to the third embodiment of the present invention, the method for manufacturing a polarizing element including locally bleached areas includes steps of providing a polarizing element including a polyvinyl alcohol-based polarizer in which at least one of iodine and dichroic dye is oriented in a certain direction and a transparent polymer film attached to one surface of the polarizer; forming a resin coating layer on one surface of the polarizing element; forming a punched area on the resin coating layer; partially bleaching the polarizing element including the resin coating layer formed with a punched area by immersing the polarizing element into a bleaching bath; crosslinking the partially bleached polarizing element by immersing the partially bleached polarizing element into a crosslinking bath; and washing and drying the crosslinked polarizing element. Meanwhile, as necessary, a polarizing element roll may be manufactured by winding the polarizing element including locally bleached areas manufactured as above. The crosslinking step may further include a neutralizing step, or may be replaced with a neutralizing step.

First, from a roll winding a polarizing element including a polyvinyl alcohol-based polarizer in which at least one of iodine and dichroic dye is oriented in a certain direction and a transparent polymer film attached to one surface of the polarizer (110), the polarizing element is unwound.

Next, a resin composition is coated on the surface of the polarizer on which the transparent polymer film is not attached (1200), the result is cured using light, heat or the like (1400) to form a resin coating layer. Next, a punched area is machined in the resin coating layer. Herein, the punched area machining may be carried out using laser hole drilling machine (2000) as shown in FIG. 4.

When the polarizing element including the resin coating layer formed with a punched area is formed through a process such as above, the polarizing element is partially bleached by immersing the polarizing element into a bleaching bath (400) filled with a bleaching solution. When the bleaching process is complete, the polarizing element is crosslinked by being immersed into a crosslinking bath (500) filled with a crosslinking solution, and when the crosslinking is complete, the polarizing element is washed and dried by being passed through a washing roll (620) and a heating roll (660). Herein, the polarizing element may be neutralized using a neutralizing solution instead of a crosslinking solution, or both crosslinking and neutralization may be carried out. Next, a roll of the polarizing element including locally bleached areas is manufactured by winding the dried polarizing element on a roll. Meanwhile, although not shown in the drawings, a step of laminating an optical film on one surface or both surfaces of the polarizing element and/or forming an optical layer such as a hard coating layer, an anti-reflection layer, an adhesive layer or a gluing layer may be additionally carried out before winding the polarizing element on the polarizing element roll.

Meanwhile, the present invention provides a method for manufacturing a single sheet-type polarizing element including locally bleached areas from the polarizing element roll of the present invention manufactured using a method such as above.

The method for manufacturing a single sheet-type polarizing element including locally bleached areas of the present invention includes steps of providing a polarizing element from a roll of the polarizing element including locally bleached areas manufactured according to the method of the present invention; and cutting the polarizing element into a chip shape.

Herein, the step of providing a polarizing element may be carried out using a method of unwinding the polarizing element from a roll of the polarizing element including locally bleached areas, and the cutting step is, while not being limited thereto, preferably carried out using a laser. It is due to the fact that, when cutting a polarizing element using a mold or a knife, the occurrence of defects increases since controlling the bleached area to be in the same location is difficult in the cut polarizing element. In addition, cutting with a laser is advantageous in that the shape of the polarizing element is relatively freely controlled compared to using a mold or knife. For example, when cutting the polarizing element using a laser, modifications such as making the four edge shapes of the polarizing element different from each other, or cutting the polarizing element into a curve shape instead of a straight line shape may be made.

Figure 5:
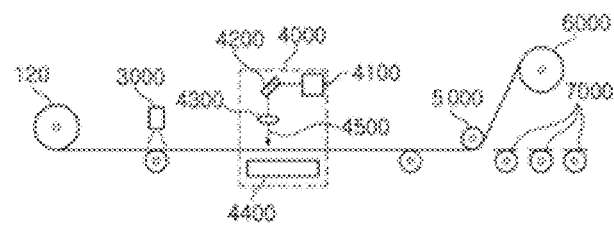
FIG. 5 is a diagram showing one embodiment of a method for manufacturing a single sheet-type polarizing element according to the present invention.

More preferably, the cutting step may include, as shown in FIG. 5, steps of recognizing a location of the bleached area of the polarizing element; setting a cutting location based on the location information of the bleached area; and carrying out the cutting at the cutting location using a laser. Herein, the step of recognizing a location of the bleached area may be carried out using VISION equipment (3000) such as a CCD camera, and the location of the bleached area may be, for example, a specific location such as the center of the bleached area. Meanwhile, while not being mandatory, the VISION equipment (3000) may be set to recognize the end location or the progress direction of the polarizing element in addition to recognizing the location of the bleached area, or separate VISION equipment (not shown) for recognizing the end location or the progress direction of the polarizing element may be provided, in order to enhance cutting precision.

Figure 6B:
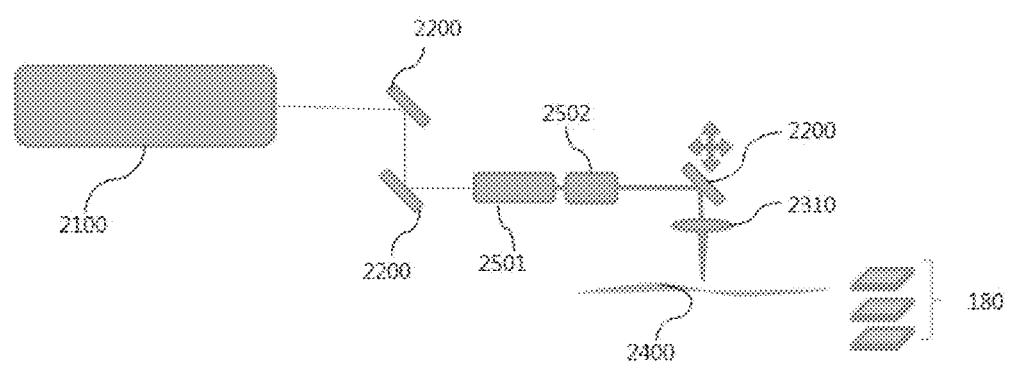
FIG. 6b is a diagram showing one example of a specific structure of laser equipment in FIG. 5.

Next, the step of setting a cutting location of the polarizing element is carried out using the location of the bleached area. This step may be carried out through an arithmetic equipment electrically connected to the VISION equipment (3000) (not shown), and information on the set cutting location is transferred to laser equipment (4000). Next, the polarizing element is cut using the laser equipment (4000) following the information on the cutting location. In addition, the specific structure of the laser equipment (4000) is shown in FIG. 6b. FIG. 6b may be a specific structure of the laser equipment of FIG. 5.

When cutting the polarizing element through a method such as above, the cutting location is set from the location of the bleached area, therefore, the locations of the bleached areas are identical in the finally produced single sheet-type polarizing element, and as a result, defects may decrease and quality uniformity may be enhanced.

When cutting the polarizing element through a process such as above, a single sheet-type polarizing element (7000) may be obtained by separating the cut single sheet-type polarizing element (7000) from the remainder (6000) using a stripping roll (500) and the like.

In another aspect, the present invention provides a single sheet-type polarizing element including locally bleached areas manufactured using the method for manufacturing a single sheet-type polarizing element described above.

In another aspect, the present invention provides a polarizing plate including the single sheet-type polarizing element. As described above, the locally bleached area may be a depolarized area, and as the single transmittance and the polarization degree of the depolarized area, those described above may be applied. Meanwhile, the single transmittance of areas in the polarizing plate excluding the depolarized area is preferably from 40% to 47%, and more preferably from 41% to 46%. Moreover, the areas in the polarizing plate excluding the depolarized area preferably has a polarization degree of 99% or higher. This is due to the fact that the rest of the area excluding the depolarized area needs to exhibit excellent optical properties shown in the range described above by performing a primary function as a polarizing plate.

The polarizing plate may include constituents known in the art except including the polarizing element including locally bleached areas manufactured according to one embodiment of the present invention. For example, a retardation film, a hard coating layer and the like may be further included, however, the constituents are not limited thereto.

In another aspect, the present invention provides an image display device including a display panel; and the polarizing plate described above attached to one surface or both surfaces of the display panel.

The display panel may include a liquid crystal panel, a plasma panel and an organic light emitting panel, and accordingly, the image display device may include a liquid crystal display (LCD), a plasma display panel (PDP) and an organic light emitting diode (OLED).

More specifically, the image display device may be a liquid crystal display including a liquid crystal panel and polarizing plates each provided on both surfaces of the liquid crystal panel, and herein, at least one of the polarizing plates may be a polarizing plate including the polarizer according to one embodiment of the present invention described above.

Herein, the types of the liquid crystal panel included in the liquid crystal display are not particularly limited. For example, known panels including panels using a passive matrix method such as a twisted nematic (TN) type, a super twisted nematic (STN) type, a ferroelectic (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display such as upper and lower substrates (ex. color filter substrate or array substrate) are not particularly limited as well, and constitutions known in the art may be employed without limit.

According to another embodiment of the present invention, the image display device may be an image display device further including a camera module provided in a depolarized area of the polarizing plate. By locating a camera module in a depolarized area in which transmittance in a visible region is enhanced, and the polarization degree is relieved, an effect of enhancing visibility of the camera lens unit may be obtained.

Hereinafter, the present invention will be described in more detail with reference to examples. However, the following examples are for illustrative purposes only, and the scope of the present invention is not limited thereto.

EXAMPLE 1

Process 1. A triacethyl cellulose (TAC) film was attached to one surface of an elongated polarizing element using a UV adhesive, and on the opposite surface, a PET film was laminated on the opposite surface of the polarizing element without adhesion in order to prevent the damage of the polarizing element. As the PVA film used in the polarizing element, a commercial product manufactured by Kuraray Co., Ltd. was used.

Process 2. A mask film was prepared using a protective PET film used for surface protection of a polarizing film. The protective PET film had a structure in which PET/gluing agent/releasing film are laminated, and a punched area was formed in a target area using laser equipment. The releasing film of the mask film formed with the punched area was stripped off, and the PET film that was attached to the polarizing element manufactured in Process 1 without adhesion was removed in order to expose the polarizing element, and then the mask film was attached to the polarizing element using a gluing agent to manufacture a polarizing element.

Process 3. The polarizing element manufactured according to Process 2 was immersed into a 10% KOH (potassium hydroxide) solution, and then neutralized using a 3% citric acid solution to manufacture a partially bleached polarizing element.

Specifically, immersion was carried out under a condition of the KOH solution temperature being 50° C., and the treatment period being 15 seconds, and after the immersion, the film was washed with purified water at 20° C., and neutralization was carried out by immersing the result into a 3% citric acid solution for 10 seconds at 25° C. Washing was carried out with purified water at 20° C. in order to remove the residual acid solution after the neutralization. After the neutralization, drying was carried out by passing the result through a drying oven for 30 seconds at 50° C. in order to remove moisture remaining after removing the mask layer.

Comparative Example 1

A polarizing element was manufactured in the same manner as in Example 1 except that the neutralizing step was not carried out.

Figure 7:
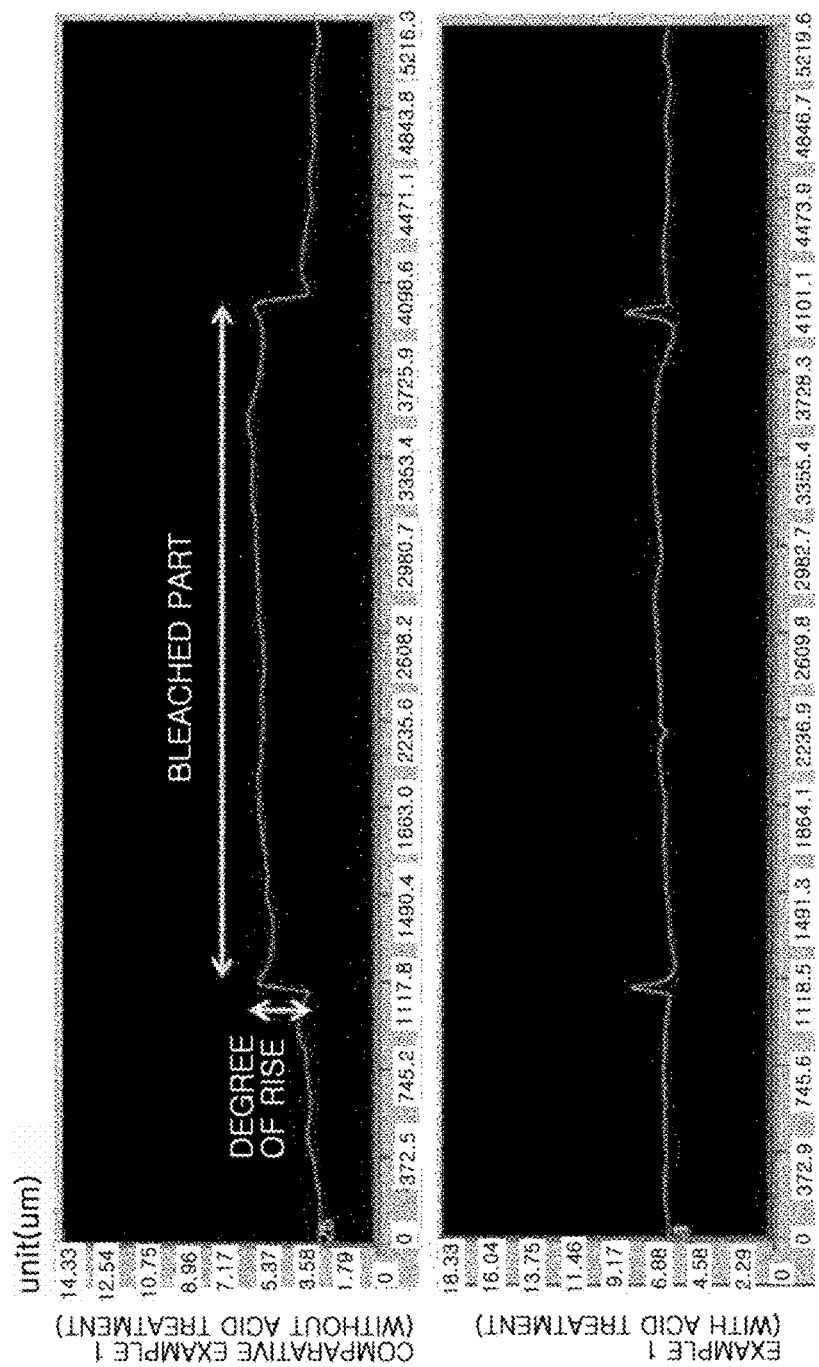
FIG. 7 and FIG. 8 are results measuring a degree of appearance deformation of a partially bleached part of a polarizing element each manufactured according to Example 1 and Comparative Example 1 using a laser microscope.
Figure 8:
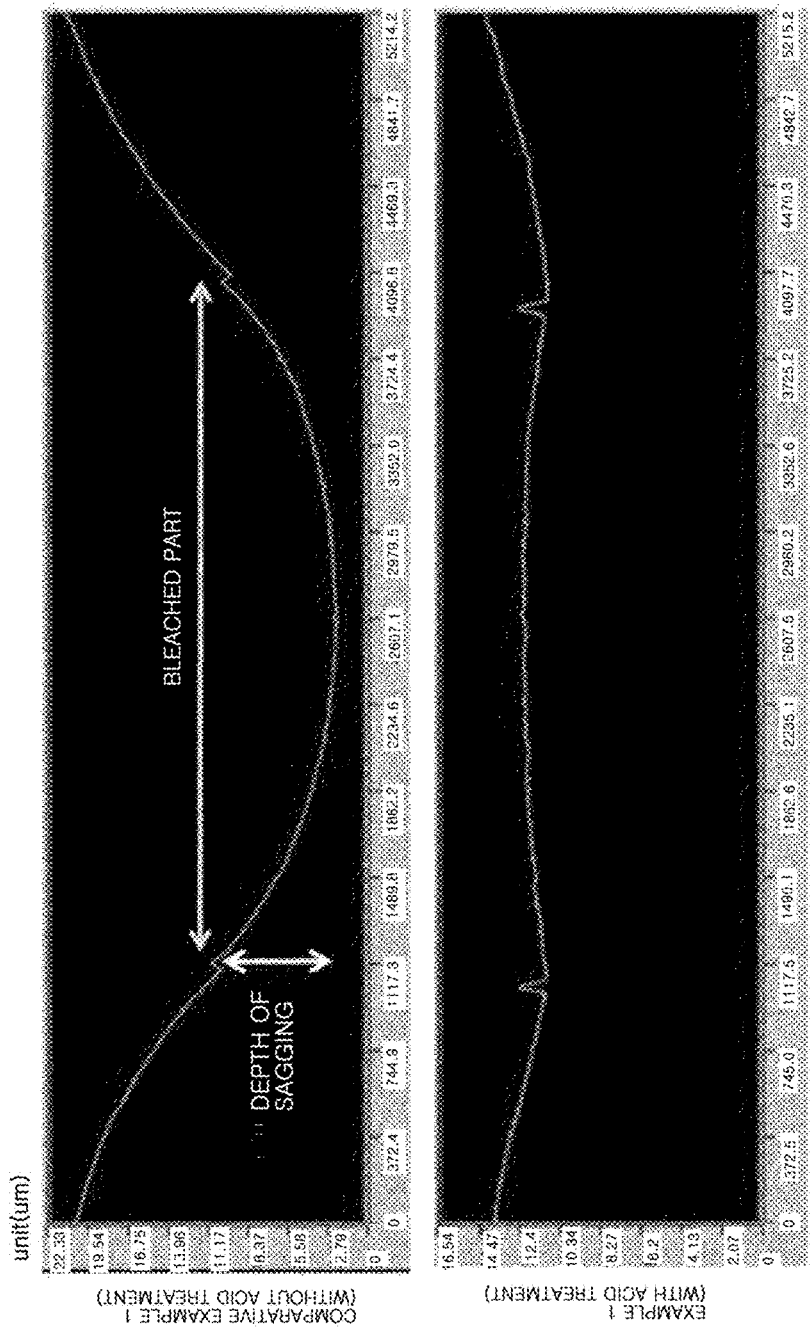

It was identified that the degree of appearance deformation in the partially bleached part of the polarizing element manufactured according to Example 1 was reduced compared to the polarizing element manufactured according to Comparative Example 1, and the results are shown in FIG. 7 and FIG. 8.

FIG. 7 is a result comparing the degree of the rise of the bleached part in Example 1 and Comparative Example 1, and specifically, is a result measuring the height of the rise of the bleached part using a laser microscope.

Meanwhile, FIG. 8 is a result comparing the degree of the sagging of the bleached part in Example 1 and Comparative Example 1, and specifically, is a result measuring the depth of the sagging of the bleached part compared to surrounding parts using a laser microscope.

Through FIG. 7 and FIG. 8, it was seen that, deformation of the polarizing element appearance was reduced by carrying out the appearance correcting step after the partially bleaching step, and as a result, dimensional stability was able to be increased, as in one embodiment of the present invention.

The invention claimed is:

1. A method for manufacturing a roll of a polarizing element including locally bleached areas by a continuous process comprising:
    providing a polarizing element including a polyvinyl alcohol-based polarizer in which at least one of iodine and dichroic dye is oriented in a certain direction;
    forming a mask layer including at least one punched area on one surface of the polarizing element;
    attaching a temporary protective film on the surface opposite to the surface on which the mask layer is formed;
    partially bleaching the polarizing element laminated with the mask layer and the temporary protective film by immersing the polarizing element into a bleaching solution;
    removing the mask layer and the temporary protective film from the polarizing element sequentially after the step of immersing the polarizing element into a bleaching solution;
    correcting an appearance of the partially bleached polarizing element;
    washing with purified water and drying the polarizing element after the step of correcting an appearance,
    wherein the step of correcting an appearance of the partially bleached polarizing element is carried out using a method of immersing the polarizing element into a neutralizing solution,
    wherein the neutralizing solution includes one or more types of neutralizing agents selected from the group consisting of sulfuric acid, citric acid, and hydrochloric acid, and
    wherein the locally bleached areas have single transmittance of 90% or greater in a wavelength band of 400 nm to 800 nm.

2. The method for manufacturing a roll of a polarizing element including locally bleached areas by a continuous process of claim 1, wherein the step of forming a mask layer includes forming a punched area on a mask film; and attaching the mask film on one surface of the polarizing element.

3. The method for manufacturing a roll of a polarizing element including locally bleached areas by a continuous process of claim 2, wherein the mask film is a polyethylene (PE) film, a polypropylene (PP) film, a polyethylene terephthalate (PET) film, an ethylene vinyl acetate (EVA) film or a polyvinyl acetate film.

4. The method for manufacturing a roll of a polarizing element including locally bleached areas by a continuous process of claim 1, wherein the step of forming a mask layer includes forming a coating layer on one surface of the polarizing element; and forming a punched area by selectively removing some areas of the coating layer.

5. The method for manufacturing a roll of a polarizing element including locally bleached areas by a continuous process of claim 4, wherein the coating layer is formed using a polymer resin composition or a photosensitive resin composition.

6. The method for manufacturing a roll of a polarizing element including locally bleached areas by a continuous process of claim 4, wherein the step of forming a punched area is carried out through laser machining.

7. The method for manufacturing a roll of a polarizing element including locally bleached areas by a continuous process of claim 1, wherein the temporary protective film is a polyethylene (PE) film, a polypropylene (PP) film, a polyethylene terephthalate (PET) film, an ethylene vinyl acetate (EVA) film or a polyvinyl acetate film.

8. The method for manufacturing a roll of a polarizing element including locally bleached areas by a continuous process of claim 1, wherein the bleaching solution is a strong basic solution having a pH of 11 to 14.

9. The method for manufacturing a roll of a polarizing element including locally bleached areas by a continuous process of claim 8, wherein the bleaching solution includes one or more types of bleaching agents selected from the group consisting of sodium hydroxide (NaOH), sodium hydrosulfide (NaSH), sodium azide ($NaN_3$), potassium hydroxide (KOH), potassium hydrosulfide (KSH) and potassium thiosulfate ($KS_2O_3$).

10. The method for manufacturing a roll of a polarizing element including locally bleached areas by a continuous process of claim 9, wherein a concentration of the bleaching agent in the bleaching solution is from 1% by weight to 30% by weight.

11. The method for manufacturing a roll of a polarizing element including locally bleached areas by a continuous process of claim 1, wherein the partially bleaching step is carried out for 1 second to 60 seconds in a bleaching solution at 10° C. to 70° C.

12. The method for manufacturing a roll of a polarizing element including locally bleached areas by a continuous process of claim 1, wherein the drying in the washing and drying step is carried out by passing the polarizing element through a drying oven.

13. The method for manufacturing a roll of a polarizing element including locally bleached areas by a continuous process of claim 1, further comprising forming an optical layer on at least one surface of the polarizing element after the appearance correcting step.

14. The method for manufacturing a roll of a polarizing element including locally bleached areas by a continuous process of claim 13, wherein the optical layer is a protective film, a retardation film, a brightness enhancement film, a hard coating layer, an anti-reflection layer, a gluing layer, an adhesive layer or a combination thereof.

15. A method for manufacturing a single sheet-type polarizing element comprising:
provIding a polarizing element from the roll of the polarizing element including locally bleached areas manufactured according to the manufacturing method of claim 1; and cutting the polarizing element into a chip shape.

16. The method for manufacturing a single sheet-type polarizing element of claim 15, wherein the cutting step is carried out using a laser.

17. The method for manufacturing a single sheet-type polarizing element of claim 16, wherein the cutting step includes recognizing a location of a bleached area of the polarizing element; setting a cutting location based on the location of the bleached area; and carrying out the cutting at the cutting location using laser.

* * * * *